United States Patent [19]

Schelp

[11] 4,375,745
[45] Mar. 8, 1983

[54] AIR BLAST FUEL NOZZLE SYSTEM

[75] Inventor: Rainer H. Schelp, Chandler, Ariz.

[73] Assignee: The Garrett Corporation, Los Angeles, Calif.

[21] Appl. No.: 259,646

[22] Filed: May 1, 1981

Related U.S. Application Data

[63] Continuation of Ser. No. 5,629, Jan. 22, 1979.

[51] Int. Cl.³ .................................. F02C 7/057
[52] U.S. Cl. .................................. 60/39.29; 60/726; 60/737; 60/39.141; 60/39.511
[58] Field of Search ............... 60/726, 727, 728, 729, 60/39.29, 39.23, 39.14 R, 740; 417/2

[56] References Cited

U.S. PATENT DOCUMENTS

| | | | |
|---|---|---|---|
| 2,595,759 | 5/1952 | Buckland | 60/740 |
| 2,635,425 | 4/1953 | Thorpe et al. | 60/742 |
| 2,976,683 | 3/1961 | Flanigan et al. | 60/39.14 R |
| 3,224,195 | 12/1965 | Walsh | 60/740 |
| 3,581,493 | 6/1971 | Trumbull | 60/726 |
| 3,688,497 | 9/1972 | Bracken | 60/726 |
| 3,722,218 | 3/1973 | Lapera | 60/740 |
| 4,078,377 | 3/1978 | Owens et al. | 60/39.51 R |
| 4,081,958 | 4/1978 | Schelp | 60/39.51 R |
| 4,085,579 | 4/1978 | Holzapfel et al. | 60/39.51 R |

*Primary Examiner*—Carlton R. Croyle
*Assistant Examiner*—Donald E. Stout
*Attorney, Agent, or Firm*—J. Richard Konneker; Albert J. Miller

[57] ABSTRACT

An air blast nozzle system for a gas turbine engine including a fuel nozzle supplied with fuel, and blast air taken from the discharge side of the engine compressor. The blast air is boosted in pressure by a boost pump acting as a supercharger during selected modes of operation for improved fuel atomization.

6 Claims, 3 Drawing Figures

AIR BLAST FUEL NOZZLE SYSTEM

This is a continuation application of Ser. No. 5,629 filed Jan. 22, 1979.

BACKGROUND OF THE INVENTION

This invention relates to an air blast fuel nozzle system for gas turbine engines, and is particularly adapted for use with recuperated gas turbine engines.

Gas turbine engines in general are widely known in the art, and commonly comprise a compressor and expansion turbine coupled together for simultaneous rotation on a common shaft. Alternately, some gas turbine engines include multiple compressor sections and/or multiple turbine sections which may include a free power turbine. In any event, the compressor functions to compress ambient air for supply to a combustor for atomization with fuel and subsequent ignition. The combustion of the fuel-air mixture results in high energy exhaust gases which are expanded through the turbine for obtaining power output, and for rotatably driving the compressor.

For improved efficiency, it is well known to employ a recuperating heat exchanger in combination with the basic gas turbine components. That is, a heat exchanger, or recuperator, is interposed between the exhaust side of the expansion turbine and ambient to pick up and retain a substantial portion of the heat energy remaining in the exhaust gases. The heat energy is transferred within the recuperator to the compressed air from the compressor in order to substantially elevate the temperature thereof. The compressed air ultimately supplied to the combustor via the recuperator thus is at a substantially higher energy level than it otherwise would be were the recuperator not employed. In this manner, substantially less fuel in the combustor is required to raise the combustor exhaust gases to design temperature limits resulting in substantially improved engine fuel economy.

Prior art recuperated gas turbine engines typically are designed to have a relatively low pressure drop across the combustor for optimized engine performance. Hence, the available pressure drop across a combustor fuel nozzle is also relatively low, since the fuel nozzle pressure drop corresponds with the pressure differential across the combustor. This results in marginal, unsatisfactory fuel atomization during engine starting and certain acceleration modes when fuel flow is relatively high compared to fuel nozzle pressure drop. At these conditions, insufficient air atomization energy results in ignition difficulties and poor engine efficiency, particularly when relatively high viscosity fuels such as diesel fuel are used. These ignition problems are compounded by the requisite air pressure drop across the recuperator, and are further compounded during high altitude and/or cold ambient operating conditions.

Prior art systems have been developed including, for example, nozzle assist devices for providing pressurized "secondary" air to a fuel nozzle during starting conditions to momentarily improve fuel atomization. However, these devices add significantly to the cost and complexity of the fuel nozzle system, and are of little value at other modes of engine operation such as acceleration, etc. Other relatively complicated auxiliary fuel nozzle systems have also been proposed which employ specially designed fuel nozzle systems for adequate atomization during starting, and which may be fed with high pressure gas as from pressurized cartridges or the like in order to start the engine. However, these special starting nozzles normally must be disabled after the engine is started, and conventional "run" nozzles supplied with recuperated discharge air are employed during "running" conditions. Again, the special nozzle designed for improved atomization are of little value at other operational conditions such as acceleration wherein improved atomization is required. See, for example, U.S. Pat. Nos. 2,574,495 and 3,095,705. Accordingly, these systems require duplicate fuel nozzle arrangements which undesirably raise the cost and complexity of the engine, can contribute to fuel nozzle fouling, and yet do not completely satisfy atomization requirements at all conditions of engine operation.

This invention overcomes the problems and disadvantages of the prior art by providing a fuel nozzle system including a selectively operated supercharging boost pump for controllably supplying non-recuperated boosted compressor discharge air to the nozzle when required for improved fuel atomization.

SUMMARY OF THE INVENTION

In accordance with the invention, an air blast fuel nozzle system comprises a combustor having a fuel nozzle supplied with non-recuperated blast air from the compressor discharge of a gas turbine engine. The compressor discharge air is supplied to the nozzle via a boost system including a boost pump which may be externally driven as by electrical or other means. The boost pump controllably and substantially boosts the pressure level of the air during selected modes of engine operation, such as starting and/or rapid acceleration, and thereby substantially increases the pressure drop across the fuel nozzle for proper fuel atomization in the nozzle and combustor. When the engine is running, and boosted blast air is not required for atomization, the boost pump is controllably disabled to allow compressor discharge blast air to flow freely therethrough, or alternately through a selectively opened bypass to the fuel nozzle and combustor.

BRIEF DESCRIPTION OF THE DRAWINGS

The accompanying drawings illustrate the invention. In such drawings.

DETAILED DESCRIPTION OF THE PREFERRED EMBODIMENT

Figure 1:
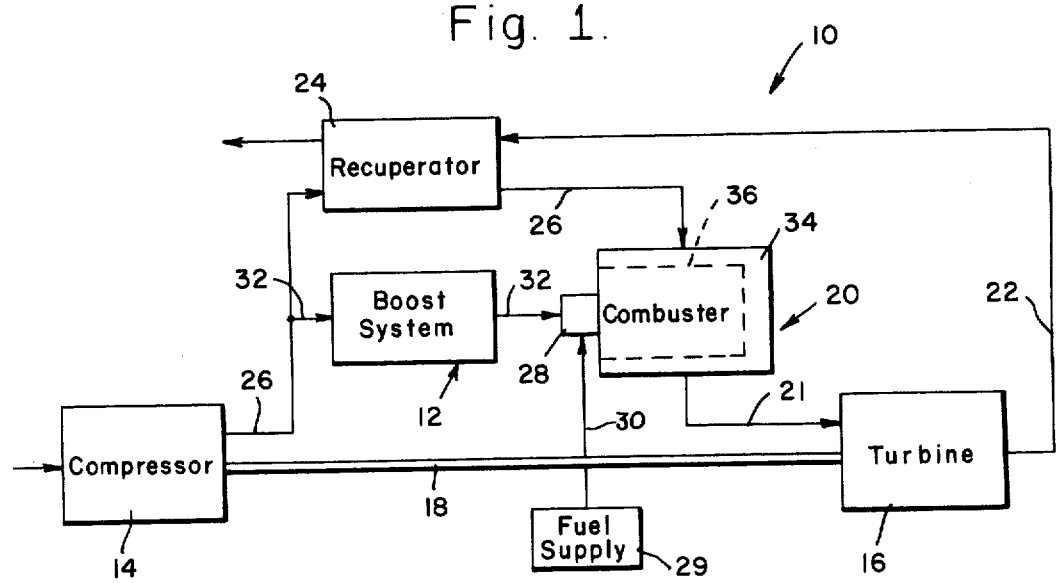
FIG. 1 is a schematic diagram of a gas turbine engine including the air blast fuel nozzle system of this invention.

A recuperated gas turbine engine 10 including a boost system 12 of this invention is shown in FIG. 1, and generally comprises a compressor 14 and a turbine 16 connected together on a common shaft 18. The compressor 14 operates to compress ambient air, and to supply the air to a combustor 20. In the combustor 20, the compressed air is combined with fuel, and combusted to yield high energy, high temperature exhaust gases which are coupled via a conduit 21 for expansion through the turbine 16. In this manner, the turbine 16 may function to perform useful work, as well as to drive the compressor 14 via the shaft 18 for compression of the ambient air.

As shown in FIG. 1, the exhaust gases expanded through the turbine 16 are fed as by a conduit 22 for passage to atmosphere through a heat exchanger, or recuperator 24. The recuperator 24 serves to recover a substantial portion of the remaining heat energy in these exhaust gases, and to transfer this heat energy to the compressor discharge air. More specifically, the compressor discharge air supplied to the combustor 20 is fed as by a conduit 26 for passage through the recuperator 24 to pick up heat energy from the exhaust gases. In this manner, the temperature of the compressor discharge air is substantially elevated prior to combustion with fuel in the combustor 20, thereby resulting in substantial fuel economies in the operation of the combustor.

A fuel nozzle 28 is mounted on the combustor 20, and is supplied with fuel from a fuel supply 29 as by a fuel line 30. This fuel is atomized by the nozzle and injected into the combustor 20 by means of compressed blast air taken from the discharge side of the compressor 14 upstream of the recuperator 24 and supplied to the nozzle 28 via a line 32. While the specific construction of the nozzle 28 is not shown or described in detail, a variety of nozzle constructions are contemplated, with a preferred nozzle comprising that shown and described in U.S. patent application Ser. No. 855,049, filed Nov. 25, 1977, now abandoned, and assigned to the assignee of this application.

The atomized fuel and air is combusted within the combustor 20, along with secondary air supplied to the combustor from the recuperator 24 by the conduit 26. In this regard, the combustor 20 comprises an outer shell 34 in which is mounted a can-type perforated or annular combustor element 36. The atomized fuel and air stream is initially ignited within the combustor element 36 by suitable ignitor means (not shown), with further sustained combustion occurring within the element 36 by virtue of the entry of the secondary air within the shell 34 via the conduit 26. Importantly, the construction of the combustor element 36 and shell 34, together with the admission of the secondary air from the recuperator line 26 is conventional in the art, and thus is not shown in detail.

The fuel nozzle 28 is supplied with pressurized compressor discharge air taken by the conduit 32 from the discharge side of the compressor 14 upstream of the recuperator 24. This discharge conduit 32 passes a small portion of the compressor discharge air through the supercharging boost system 12 prior to the fuel nozzle 28 for appropriate boosting of the pressure level thereof during prescribed engine operating conditions. In this manner, the energy level of the atomization air supplied to the nozzle 28 is regulated to assure complete atomization of the fuel supplied thereto for proper starting and/or atomization where the pressure level of the compressor discharge blast air would otherwise be insufficient for proper engine operation.

Figure 2:
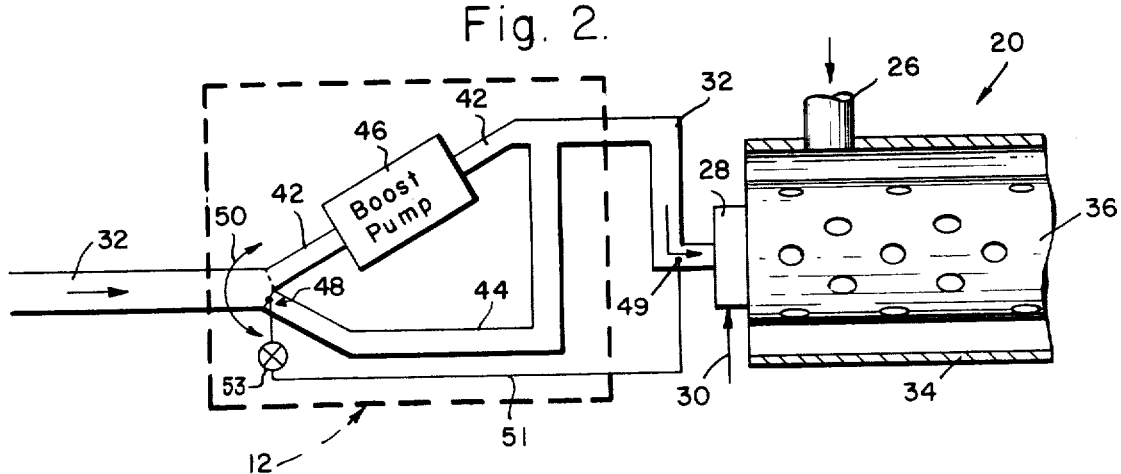
FIG. 2 is a schematic diagram of one embodiment of the nozzle system.

One embodiment of the supercharging boost system 12 is shown in FIG. 2. As shown in this embodiment, the compressed blast air discharge 32 from the compressor 14 splits upstream of the fuel nozzle 28 into a pair of parallel branch conduits 42 and 44. The branch conduit 42 includes a supercharging boost pump 46 which may comprise an electrically driven vane-type pump or the like for boosting the pressure level of the compressor discharge gases passing therethrough. Alternately, this boost pump may comprise a positive displacement pump, or another suitable type of pump conveniently driven as by a suitable external source. In operation, the boost pump 46 functions to raise the pressure level of the compressed discharge air to a level sufficient to assure proper air blast atomization of the fuel in the nozzle 28, together with the required pressure differential across the combustor 20 for starting purposes. In this manner, the engine is easily started, and may be accelerated as desired by appropriately controlling the boost pump 46. Engine nonignition or poor acceleration performance due to losses in combustor efficiency resulting from poor atomization of fuel are thus avoided.

The second branch conduit 44 is open, and serves to bypass the compressor discharge air from the conduit 32 around the boost pump 46 for direct supply to the fuel nozzle 28. A two-way valve 48 is mounted at the upstream junction of the branch conduits 42 and 44, and may be suitably controlled as by a controller 53 for shifting as illustrated by arrow 50 to close one of the conduits 42 and 44. In this manner, the compressed air is either boosted by the boost pump 46, or is fed through the open conduit 44 to the nozzle 28. Of course, the valve 48 bypasses the air around the boost pump 46 through the open conduit 44 whenever there is sufficient blast air flow through the compressor 14 for proper engine operation. Importantly, even when the boost pump 46 is bypassed, the nonrecuperated blast air supplied to the nozzle 28 is at a higher pressure level than the recuperated secondary air supplied to the combustor 20 via the conduit 26 thereby resulting in improved fuel nozzle pressure drop and improved fuel atomization.

The two-way valve 48 is suitably controlled by the controller 53 according to selected engine operating conditions to correspondingly control use of the boost pump 46 for supercharging the compressor discharge blast air. As shown by way of example in FIG. 2, one control scheme for the valve 48 may comprise a pressure sensor 49 mounted in the conduit 32 downstream of the boost pump 46 for sensing the pressure level of atomization air supplied to the fuel nozzle 28. The sensor 49 operates to signal the controller 53 by means of a signal line 51 to close the bypass branch conduit 44 and to open the boost pump branch conduit 42 whenever the sensed pressure level falls below a predetermined threshold. Of course, the sensor 49 functions to operate the controller 53 to close the boost pump branch conduit 42 and to open the bypass branch conduit 44 whenever blast air boosting is not required.

Figure 3:
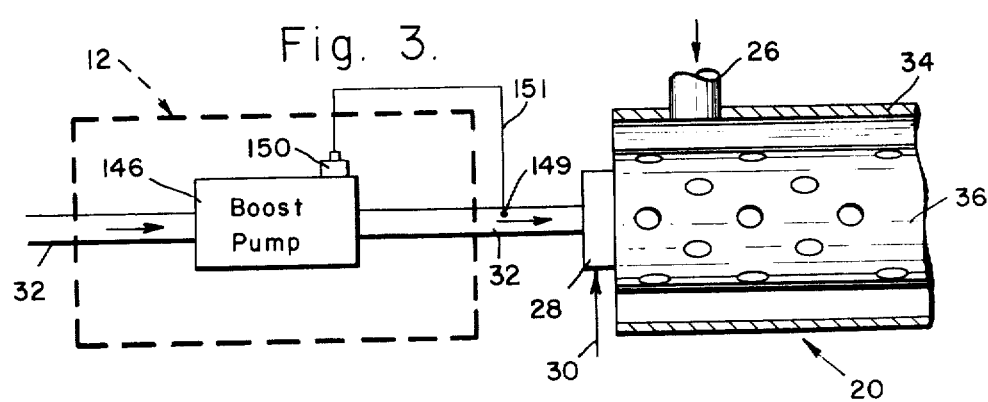
FIG. 3 is a schematic diagram of another embodiment of the nozzle system.

Another embodiment of the invention is shown in FIG. 3. As shown, the compressed air discharge conduit 32 includes a supercharging boost pump 146 connected in-line therewith for selectively boosting the pressure level of the blast air supplied to the fuel nozzle 28. In this embodiment, the pump 146 comprises a vane-type compressor or the like which is again suitably driven by a convenient external source, such as electrical drive means (not shown). Importantly, this pump 146 will relatively freely pass the blast air flow when it is not operating. Thus, the pump may be energized when desired to boost the pressure of the blast air flow, and de-energized under other conditions to allow free flow to the fuel nozzle 28 whenever the main engine compressor 14 provides sufficient blast air atomization pressure and flow. As shown, operation of the boost pump 146 may be conveniently controlled as by means of a pressure sensor 149 mounted in the conduit 32 downstream of the boost pump 146. This sensor 149 operates to signal a boost pump on-off switch 150 via a signal line 151 to operate the boost pump 146 whenever additional blast air atomization energy is required.

The air blast fuel nozzle of this invention thus provides an improved fuel atomization system particularly designed for use with recuperated gas turbine engines. The system of this invention comprises relatively simple and inexpensive system which allows improved combustor efficiency resulting in reduced exhaust emissions and/or visible smoke. Moreover, because non-recuperated blast air is utilized for fuel atomization, relatively cool air is supplied to the fuel nozzle for improved purging without coking upon engine shutdown.

A variety of modifications and improvements to the invention described herein are believed to be possible without varying from the scope of the invention. For example, a variety of boost pump control schemes are possible, such as direct wiring of the boost pump to an engine started motor, or the use of a simple manually controlled on-off switch. Accordingly, no limitation of the invention is intended except by way of the appended claims.

What is claimed is:

1. A recuperated gas turbine engine comprising:
   (a) a gas operable turbine;
   (b) a combustor;
   (c) a compressor drivably connected to said turbine;
   (d) a recuperative heat exchanger having first and second thermally communicating flow paths extending therethrough;
   (e) first conduit means for flowing exhaust gas discharged from said combustor through said turbine to operate the same, and then through said first heat exchanger flow path;
   (f) second conduit means for flowing air discharged from said compressor through said second heat exchanger flow path for recuperation of heat from turbine discharge gas flowing through said first heat exchanger flow path, and for flowing the recuperated compressor discharge air into said combustor;
   (g) air blast nozzle means mounted on said combustor for receiving and mixing fuel and pressurized air and injecting the fuel-air mixture into said combustor for mixture and combustion with said recuperated air entering said combustor;
   (h) third conduit means for flowing nonrecuperated compressor discharge air into and through said nozzle means to form and inject said fuel-air mixture, substantially all nonrecuperated compressor discharge air entering said combustor passing through said nozzle means;
   (i) boost pump means disposed in said third conduit means for selectively and controllably boosting the pressure of said nonrecuperated compressor discharge air entering said nozzle means; and
   (j) control means for energizing said boost pump means when the pressure level of said nonrecuperated compressor discharge air received by said nozzle means is less than a predetermined magnitude, and for de-energizing said boost pump means when said pressure level exceeds said predetermined magnitude.

2. A recuperated gas turbine engine comprising:
   (a) a gas operable turbine;
   (b) a combustor;
   (c) a compressor drivably connected to said turbine;
   (d) a recuperative heat exchanger having first and second thermally communicating flow paths extending therethrough;
   (e) first conduit means for flowing exhaust gas discharged from said combustor through said turbine to operate the same, and then through said first heat exchanger flow path;
   (f) second conduit means for flowing air discharged from said compressor through said second heat exchanger flow path for recuperation of heat from turbine discharge gas flowing through said first heat exchanger flow path, and for flowing the recuperated compressor discharge air into said combustor;
   (g) air blast nozzle means mounted on said combustor for receiving and mixing fuel and pressurized air and injecting the fuel-air mixture into said combustor for mixture and combustion with said recuperated air entering said combustor;
   (h) third conduit means for flowing nonrecuperated compressor discharge air into and through said nozzle means to form and inject said fuel-air mixture, substantially all nonrecuperated compressor discharge air entering said combustor passing through said nozzle means;
   (i) boost pump means operably disposed along said third conduit means;
   (j) a bypass conduit connected to said third conduit means in parallel with said boost pump means;
   (k) a valve disposed at the upstream juncture of said bypass conduit and said third conduit means for selectively closing one or the other of said bypass conduit and said third conduit means to air flow; and
   (l) control means, responsive to the pressure level of nonrecuperated compressor discharge air supplied to said nozzle means, for moving said valve to close said bypass conduit when said pressure level is less than a predetermined magnitude, and for moving said valve to close said third conduit means when said pressure level exceeds said predetermined magnitude.

3. A recuperated gas turbine engine as recited in claim 1 or 2 wherein said control means include pressure sensing means disposed in said third conduit means between said boost pump means and said air blast nozzle means.

4. For use with a recuperated gas turbine engine having a turbine, a compressor drivably connected to the turbine, a combustor, a recuperator having first and second thermally communicating passages extending therethrough, and means defining a secondary air flow path for flowing air discharged from the compressor sequentially through the first recuperator passage, the combustor, the turbine, and the second recuperator passage, an air blast fuel nozzle system comprising:
   (a) a fuel-air mixing air blast nozzle adapted to be operatively mounted on the combustor;
   (b) primary air flow path means for flowing nonrecuperated compressor discharge air into the combustor in a manner such that substantially all nonrecuperated compressor discharge air entering the combustor passes through said air blast nozzle;
   (c) an air boost pump operatively mounted along said primary air flow path means; and
   (d) control means for utilizing said boost pump to maintain a predetermined minimum nozzle air inlet pressure despite variations in compressor discharge pressure, said control means including pressure sensing means disposed in said primary air flow path means between said boost pump and said nozzle.

5. An air blast fuel nozzle system as recited in claim 4 wherein said control means further include means interconnected between said pressure sensing means and said boost pump for cycling said boost pump in response to variations in the sensed nozzle air inlet pressure.

6. An air blast fuel nozzle system as recited in claim 4 wherein said control means further include a bypass conduit connected to said primary air flow path means in parallel with said boost pump, valve means disposed at the upstream juncture of said bypass conduit and said primary air flow path means and selectively operable to close one or the other of said bypass conduit and said primary air flow path means to air flow, and means interconnected between said pressure sensing means and said valve means for operating said valve means in response to variations in the sensed nozzle air inlet pressure.

* * * * *